United States Patent [19]

Maass

[11] Patent Number: 4,928,983

[45] Date of Patent: May 29, 1990

[54] SNOW GLIDER

[76] Inventor: Freimut Maass, Kreuznacher Str. 5, D-7000 Stuttgart 50, Fed. Rep. of Germany

[21] Appl. No.: 315,186

[22] PCT Filed: Jan. 21, 1987

[86] PCT No.: PCT/DE87/00023

§ 371 Date: Nov. 23, 1987

§ 102(e) Date: Nov. 23, 1987

[87] PCT Pub. No.: WO87/04397

PCT Pub. Date: Jul. 30, 1987

Related U.S. Application Data

[63] Continuation of Ser. No. 116,946, filed as PCT DE87/00023 on Jan. 21, 1987, published as WO87/04397 on July 30, 1987, abandoned.

[30] Foreign Application Priority Data

Jan. 21, 1986 [DE] Fed. Rep. of Germany ....... 3601607
Feb. 8, 1986 [DE] Fed. Rep. of Germany ....... 3604017

[51] Int. Cl.$^5$ ............................................. B62B 13/06
[52] U.S. Cl. ...................... 280/18; 280/21.1; 280/28.16; 280/28.15
[58] Field of Search ................. 280/18.1, 28.16, 28.14, 280/845, 28.11, 18, 21.1, 14.2, 28.15, 900; 114/249, 250, 347, 355, 364

[56] References Cited

U.S. PATENT DOCUMENTS

| | | | |
|---|---|---|---|
| 2,139,513 | 12/1938 | Nelson et al. | 280/18 |
| 2,735,690 | 2/1956 | Paden et al. | 280/12 B |
| 3,026,120 | 3/1962 | Guerard | 280/12 KL |
| 3,147,020 | 9/1964 | Dahl | 280/18 |
| 3,332,697 | 7/1967 | Hagen | 280/12 R |
| 3,726,248 | 4/1973 | Glosten | 114/248 |
| 3,921,239 | 11/1975 | Sovia et al. | 280/18 X |
| 3,937,482 | 2/1976 | Johnson | 280/18 |
| 4,305,603 | 12/1981 | Muller et al. | 280/12 H |
| 4,561,664 | 12/1985 | Cashmere | 280/12 B |

FOREIGN PATENT DOCUMENTS 2647124 4/1978 Fed. Rep. of Germany .... 280/21 R

Primary Examiner—Charles A. Marmor
Assistant Examiner—Tamara L. Finlay
Attorney, Agent, or Firm—Edwin A. Greigg

[57] ABSTRACT

A snow glider with a body shell having a convex bottom with reference to the surface. At least two skids are attached along the bottom so that according to the inclination angle of the snow glider the available skids in contact with the snow steer the snow glider with a weight shifting of the operator as the snow glider assumes a curve.

13 Claims, 3 Drawing Sheets

SNOW GLIDER

This is a continuation of application Ser. No. 116,946 filed as PCT DE87/00023 on Jan 21, 1987, published as WO87/04397 on July 30, 1987, now abandoned.

BACKGROUND OF THE INVENTION

The invention relates to a device which is known as a snow glider. Presently known snow gliders are produced in various configurations and forms. The most common type comprises a plastic body with two parallel skids, and it is intended first and foremost for leisure time activities, like bob-sleighing. To steer these known snow gliders two systems are currently being used. One system includes divided skids, where the front skid section can be adjusted in order to change direction of the sleigh. The other system uses levers on the left and right hand side of the snow glider; which in order to change direction can be made to engage the snow to create friction on the runway. Disadvantages of the first system resides in the steering mechanism, which is fairly complicated. Consequently, such a snow glider becomes an expensive article. On the other hand, a steering mechanism of this type also adds weight to the snow glider, which is a nuisance while pulling the snow glider up-hill. Lastly but not least, such a device is fragile and consequently prone to damage. The second system because of its levers damages the surface which means that on many down-hill tracks this type of snow glider is not permitted to be used.

OBJECT OF THE INVENTION

As compared to the prior known structures, the invention is based on the task of developing a steering control device for snow gliders on the basis that simple weight shifting of the driver results in a directional change. As is similar with skis, the directional change of the new snow glider results through skids that are vertically inclined. While this glider is going straight, the parallel skids remain vertical to the surface and therefore no directional change occurs. As soon as weight shifting occurs and therefore the middle part of the skid reaches a certain inclination, an extra side skid which is provided with a more definite bent area which lies parallel to the main skid (there could be even several side skids), comes into contact with the snow surface. The snow glider is caused to assume a curved track. The curve becomes sharper and sharper, the greater the occupant of the glider shifts their weight and therefore the attack angle of skids which are placed laterally from the center of the vehicle are caused to contact the snow. The snow glider-body, to which the skids are attached, have a generally convex shape, especially with a wide horizontal cross-section. The cross-section of the vehicle can also be round or any other preferred shape. The advantage of this steering device results in no friction with the surface in curves, which results in a higher speed when going down-hill. The second advantage is the fact that the surface of the snow will not be damaged, and the surface of the snow glider in contact with the snow is so large that even in soft snow the vehicle will not sink in. Additionally, during change of direction by shifting the center of gravity, as it is the case with this invention, the driver of the vehicle has a far better control of it, since he always remains in the center of gravity. Therefore, this snow glider does not present the disadvantage of other such devices that at a certain high speed in the curve and therefore high centrifugal force the vehicle will be caused to tip over. This snow glider will proceed with the corresponding skids that are in contact with the snow surface in accordance with the curve radius.

Slowing down in a curve is realized by oversteering in the curve as is done in skiing, when a strong weight shifting takes place and therefore the skids turn into the curve and remain at a 90 degree angle relative to the direction of travel of the vehicle.

According to another embodiment of the invention the skids in the back part of the snow glider are recessed. In this way the above-mentioned directional steering effect by weight shifting is even better, and also the twisting of the vehicle for slowing down the snow glider is further enhanced.

To make these braking actions or steering actions more pronounced, short poles like ski poles approximately 20 cm long can be used with the hands so that a further steering action occurs. On a level surface these poles can be used similarly to skiing for pushing the snow glider.

In order to facilitate the transport of the snow glider up-hill, a device is incorporated on the snow glider chassis in order to pull it along. This device may include for example an opening in the chassis and a rope. If a lift is going to be used, one of the lift bars can be stuck into the entrance opening of the snow glider, and since the center of gravity is relatively far behind the point of attack of the lift bar, the snow glider will easily follow the lift tracks.

Another device for moving the snow glider could be a movable towing bar, which is brought forward from the chassis for towing it. This tow bar can also be formed as a roll bar or as a frontal reinforcement, and can be fixed in any desired position.

Additional advantages may be gathered from the subsequent description of the figures as wall as from the claims.

BRIEF DESCRIPTION OF THE DRAWINGS

A preferred embodiment of the object of the invention is represented in the drawing with variations.

DESCRIPTION OF THE PREFERRED EMBODIMENTS

Figure 1:
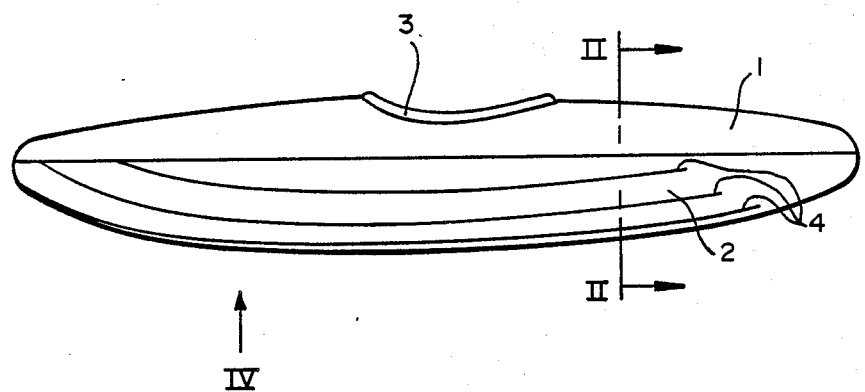
FIG. 1 shows a boat shaped snow glider in side view.
Figure 2:
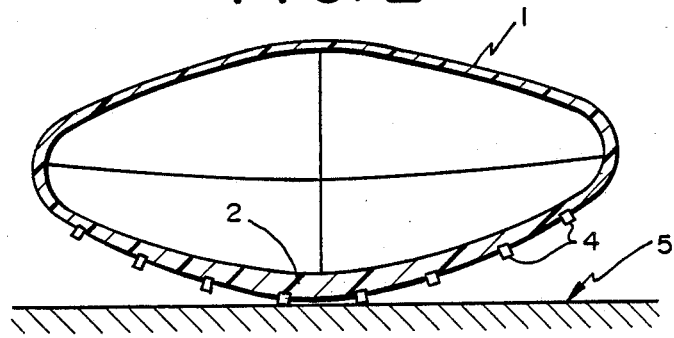
FIG. 2 is a cross-section according to line II—II in FIG. 1.
Figure 4:
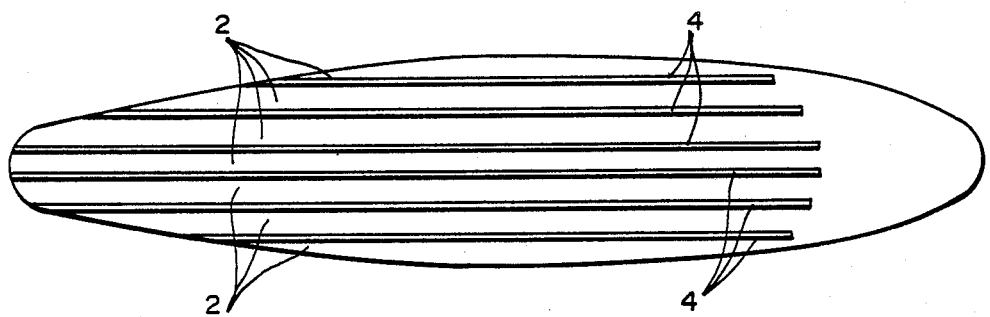
FIG. 4 is a bottom plane view of a variation of the example represented in FIGS. 1 and 3.

In FIGS. 1, 2 and 4, a boat or kayak shaped device is represented in various views that can be used as a snow glider. This "boat" has a body shell 1 which has a bottom 2 and an entrance opening 3 for the vehicle operator. Within the vehicle 1 a seating accommodation is provided, which is not shown in detail. On the bottom 2 of the snow glider there are provided parallel skids or runners 4 in a lengthwise configuration, on which the snow glider rests on the surface, so that depending on the angle of the body shell in reference to the ground only part of these skids touch the ground, thus varying the length and number of skids in contact with the snow. These skids 4 do not end at the rear end of bottom 2 of the snow glider so that the back part of the bottom 2 remains smoothly rounded but are arranged to extend towards the front. This can be seen especially clearly on FIGS. 1 and 2, where the snow surface is given the number 5. The skids 4 in this embodiment are integrated into the bottom 2.

Figure 3:
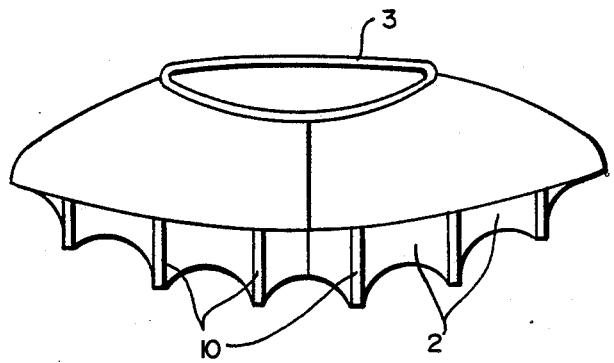
FIG. 3 is a view elevational of a modification of FIG. 1.

In FIG. 3 there is shown another embodiment of the snow glider, where the skids 4 are arranged to extend outwardly at 10 from the curved areas 2 of the boat bottom. As shown, the runners are formed as a part of the body, which includes spaced outward protrusions separated by oval shaped indentations. By this, on one side friction can be reduced to a minimum by enlarging the distance from the skid bottom part to bottom 2. On the other side one does not necessarily need additional skids as long as the synthetic material of the snow glider is hard enough.

Figure 5:
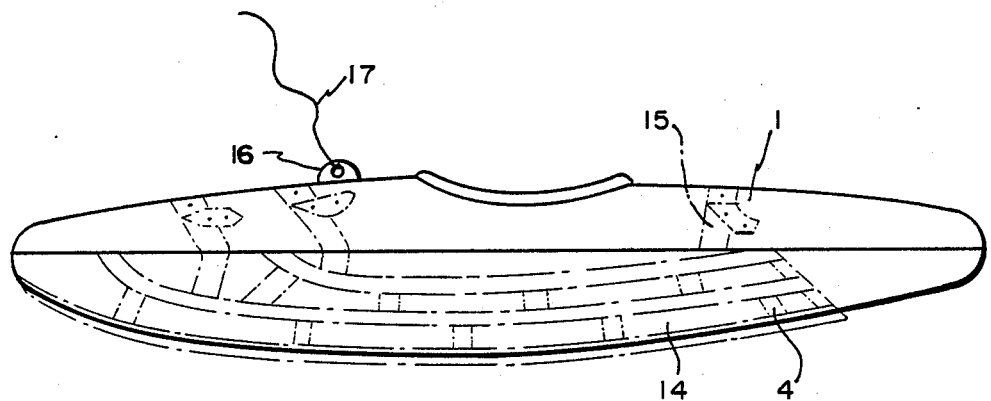
FIG. 5 is a side view of another variation according to FIG. 1 where the bottom is detachable.

In FIG. 5 a further embodiment is shown with the bottom 14, which includes separately spaced skids 4 that can be secured together by any suitable means and secured to the chassis 1. In this concept the skids are connected by straps or any suitable fastening means to the surface of the vehicle. In this embodiment it is possible to use the snow glider in summer on water, and in winter as a snow glider.

As also described in the above-mentioned embodiment shown in FIG. 5 on the body shell 1 an eyelet 16 is provided with a rope 17, in order to he able to tow the vehicle.

Figure 7:
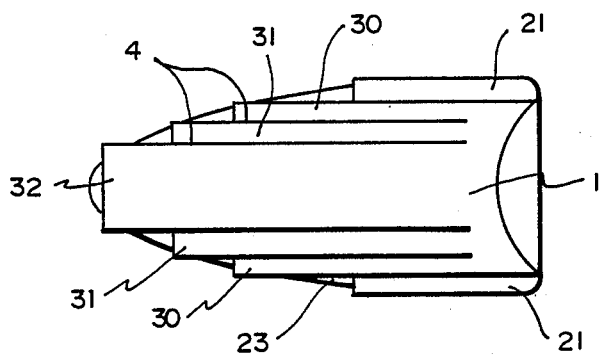
Figure 8:
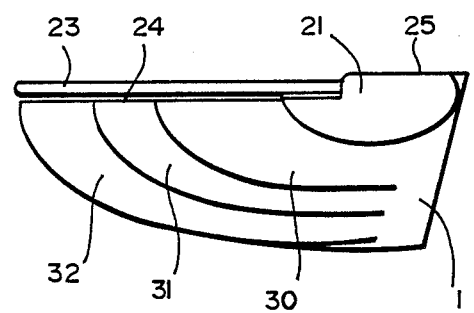
Figure 9:
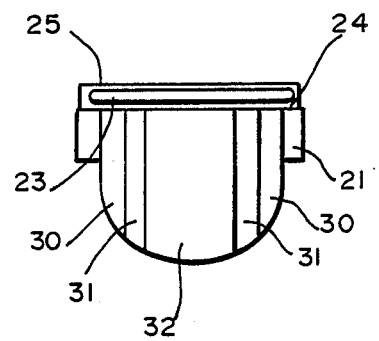

In FIGS. 6 to 9 a further embodiment is depicted with a relatively short and compact body 1, where at the sides 19 and 20, bulges 21, 30 and 31 can be seen. Bulges 21, 30 and 31 are of increasing longitudinal length from the back-to-front and from the outermost bulge to a central section 32. The bulges are formed in stepped form with horizontal bottom faces and upper surfaces with vertical walls extending from one bulge to the next bulge, and on to the bottom bulge. The bulges are somewhat rounded in the longitudinal direction from their uppermost part to the lowermost part on the front end. Not only are the bulges formed in stepped form, but the front ends of each of bulges 30, 31 and 32 are contoured from its adjacent bulge to the boat bottom such that they merge with a smooth transition on the front, as seen in FIG. 9. On the top of these bulges 21, 30 and 31 turning joints 22 are provided in which the opposite free ends of a tow bar 23 are pivotally arranged over the opening of the body 1. Whereas in the front part of the body 1, the sidewalls 24 are rather flat, the side walls 25 in the area behind the bulge 21 is much higher. Therefore, it offers the driver protection as well as lateral body contact.

In an extreme angle of the snow glider the bulges 21, 30 and 31 come into contact with the snow and this results in friction and slowing down the snow glider with a stronger curve around the bulges 21, 30 and 31. In addition with the inclusion of the bulges the sides 19 and 20 of the body 1, the entire structure becomes more rigid.

Figure 6:
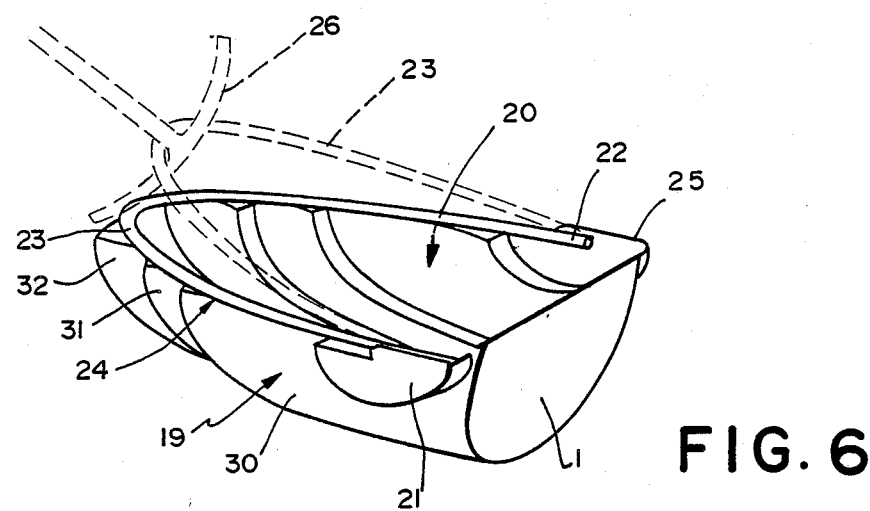
FIGS. 6–9 illustrate a further variation in different views.

In FIG. 6, there is a perspective representation of the snow glider, the tow bar 23, which is shown in a frontal position, is represented here in a position extending slightly upwards, whereas the bar 26 of a tow lift is shown, for example, as being in engagement with the tow bar. As shown in FIGS. 6 to 9 the standard or lowered position of the tow bar 23 has the function of a frontal protection for the vehicle and can be fixed or locked in this position. The fastening can be reached either through a stepped securing system in the area of joint 22 or by another device, which is not represented. The tow bar can also be used as a roll bar or as a handle for the driver.

In FIG. 7 the body as shown in FIG. 6 is shown from the bottom. In FIG. 8 a side view is shown, and in FIG. 9 a front view is shown. As it is especially visible in FIG. 7, the skids have very pointed edges whose function is enhanced by a lateral inclination of the snow glider and thus results in a special directional stability of the device.

All characteristics of the description, of the claims or characteristics of the drawings can be of importance either individually or in any combination.

I claim:

1. A snow glider comprising a body having front and aft ends to accommodate at least one person, said body having a vertical transverse cross section of an ellipsoid configuration and having a longitudinal and transverse convex bottom, bottom provided with runners extending therefrom, said runners having a longitudinal extent and being disposed on said bottom in parallel spaced relation from said front end to a point removed from said aft end thereof, whereby said person can shift his weight rearwardly to lift said runners from the snow for steering.

2. A snow glider as claimed in claim 1, in which said bottom has concave surfaces provided transversely thereof defined between adjacent runners.

3. A snow glider as claimed in claim 1, in which said runners are disposed normal to said bottom.

4. A snow glider according to claim 1, in which said runners (4) are individual skid elements attached to said bottom (2).

5. A snow glider according to claim 1, in which said runners (10) are formed integrally as a portion of said bottom.

6. A snow glider according to claim 1, in which said body includes a front section and a back section, said back section lying behind a center of gravity of said body and said runners extend only along said front section.

7. A snow glider according to claim 1, in which means are provided for towing the snow glider which are integrated into the body (1).

8. A snow glider comprising a body having an open hull with a bottom portion, a front portion and an aft portion to accommodate at least one passenger, said open hull being configured along a gunwale thereof forwardly from the aft portion in a substantially ovoid shape with a truncated aft portion, a tow bar having an arcuate configuration complementary to a shape of said gunwale is pivotably supported at one end thereof on a mounting means disposed adjacent said truncated aft portion, said bottom portion of said open hull having oppositely disposed pairs of parallel spaced runners extending along its bottom portion forwardly beginning a short distance from said truncated aft portion, and said pairs of runners increase in length in series from an upper pair of runners to a bottom central keel runner, each of said runners having horizontal bottom faces with vertical edges extending to the horizontal face of an adjacent runner, said runners thus have a serially stepped configuration, each of said pairs of runners and said central keel runner merging with said front portion of said body in a smooth transition from an uppermost edge to a lowermost edge, whereby said passenger can shift their weight rearwardly toward the aft portion to allow the hull to be steered.

9. A snow glider according to claim 8, in which arcuate deceleration means (21) are disposed on said open hull in an area of a center of gravity, and the deceleration means come into play to create friction during an occurrence of extreme tilting of said open hull during turning.

10. A snow glider as claimed in claim 8, in which said runners are integrally formed into said open hull.

11. A snow glider comprising a body having an open hull with a bottom portion, a front portion and an aft portion to accommodate at least one passenger, said open hull being configured along a gunwale thereof forwardly from the aft portion in a substantially ovoid shape with a truncated aft portion, said bottom portion of said open hull having oppositely disposed pairs of parallel spaced runners extending along its bottom portion forwardly beginning a short distance from said truncated aft portion, and said pairs of runners increase in length in series from an upper pair of runners to a bottom central keel runner, each of said runners having horizontal bottom faces with vertical edges extending to the horizontal face of an adjacent runner, said runners thus have a serially stepped configuration, each of said pairs of runners and said central keel runner merging with said front portion of said body in a smooth transition from an uppermost edge to a lowermost edge, said runners extend longitudinally from said open hull aftwardly in a smooth transition to a rounded hull form between the aft end of said runners and said truncated aft portion, whereby said passenger can shift their weight rearwardly toward the aft portion to allow the hull to be steered.

12. A snow glider according to claim 11, in which arcuate deceleration means (21) are disposed on said open hull in an area of a center of gravity, and the deceleration means come into play to create friction during an occurrence of extreme tilting of said open hull during turning.

13. A snow glider as claimed in claim 11, in which said runners are integrally formed into said open hull.

* * * * *